Patented Apr. 29, 1952

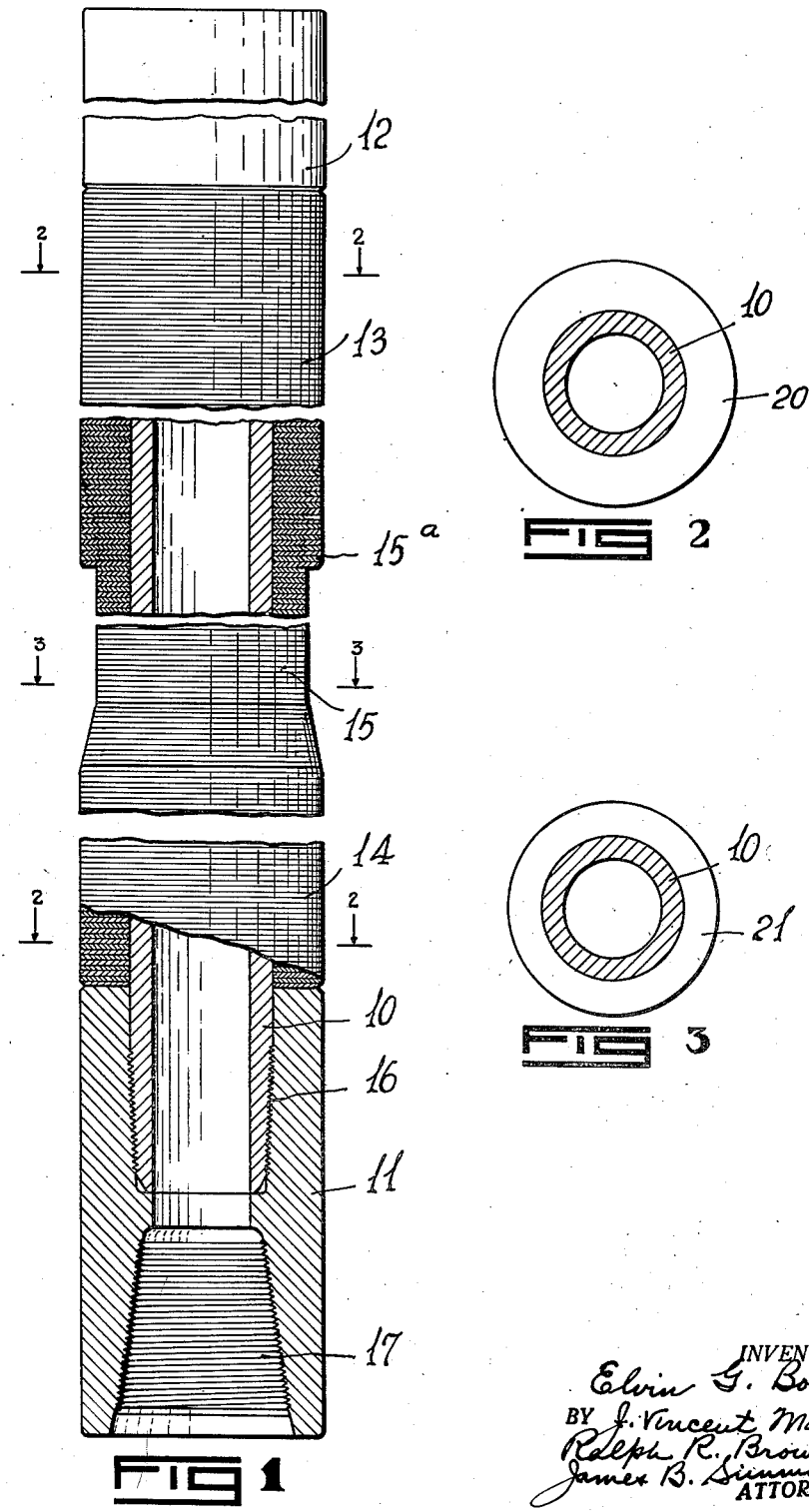

2,594,617

UNITED STATES PATENT OFFICE 2,594,617

LAMINATED DRILL COLLAR

Elvin G. Boice, Houston, Tex., assignor to Reed Roller Bit Company, Houston, Tex., a corporation of Texas Application February 13, 1946, Serial No. 647,348

5 Claims. (Cl. 255—28)

This invention relates to drill collars.

In the well drilling art, particularly in wells drilled to produce oil, a drill collar is employed at the lower end of a string of drill pipe commonly known as a drill stem, and is used in the rotary drilling of wells. The drill bit, is connected to the lower end of the drill collar, and the collar is connected to the lower end of the drill pipe or stem. The drill collar is used because it is made much heavier than the drill pipe and provides the necessary weight for drilling, at a point directly above the bit instead of at a point higher up in the drill stem which would cause the flexible drill stem to corkscrew in the well bore. The weight of the drill collar tends to make the drilling bit drill straight. Often several drill collars are used in tandem with drill subs connected therebetween. The rigidity of the collars often results in failure of the pin or pins of the drill subs.

Customarily, a drill collar is made out of a solid ingot of steel bored out with a long boring tool. The boring operation is highly expensive because the collars are usually about thirty feet or more in length. Drill collars of this invention lend themselves to economic production methods and are much less expensive than those made in the conventional manner.

The principal object of the invention is to make a fabricated drill collar.

Another object of the invention is to make a drill collar out of conventional tubing having tool joint members at the ends, taken with a plurality of laminations surrounding said tubing between said tool joints.

Another object of the invention is to make a drill collar of any length desired or to change the length of the collar by merely taking it apart and substituting a different length tubing and putting it back together with the required number of laminations.

Another object of the invention is to make a laminated drill collar.

Another object is to provide a drill collar which serves as an impact absorber.

Another object is to provide a drill collar having a highly wear resistant peripheral surface.

Other objects and advantages of this invention will become apparent from the following description taken in connection with the accompanying drawings, wherein are set forth by way of illustration and example, certain embodiments of this invention.

In the drawings:

Fig. 1 is a vertical elevation view, a portion thereof in section, of the drill collar;

Fig. 2 is a horizontal sectional view on line 2—2 of Fig. 1; and

Fig. 3 is a horizontal sectional view on line 3—3 of Fig. 1.

A relatively thin pipe 10, threaded at both ends as at 16, forms the basic supporting element of the collar. It can be made of standard 4.5 inch fishing pipe, readily obtainable and relatively inexpensive. The pipe is surrounded by laminations 20 and 21, circular in shape and made of high carbon steel of about ⅛ inch thickness, easily stamped out of sheet steel. As shown, the collar is made in five sections; the tool joints 11 and 12 being of the same external diameter; the laminated sections 13 and 14 being of the same external diameter as the tool joints and the laminated sections 15 intermediate the sections 13 and 14 being of a less external diameter than any of the other sections referred to providing an annular shoulder 15a to be engaged by lifting tools.

The tool joints 11 and 12 are provided with the usual boxes 17 and are customarily made of 7.75 inch outer diameter tool joint steel and are secured by screw threads to the pipe 10. The laminations are than shrunk upon the pipe, using the tool joints as abutments or confining members.

By employing this construction for a drill collar, it is possible to fabricate a collar out of conventional tubing and tool joint members, taken with a plurality of laminations which may be stamped out of sheet metal, instead of having to make each collar out of a solid ingot of steel. Changes in the length of the tubing 10 will determine the length of the collar, laminations being added or omitted as desired. When worn, the joints are readily replaceable.

Preferably the tool is assembled by shrinking the laminations or washers on to the tubing 10. Use of an oil bath at approximately 300° F. gives satisfactory results. Where commercial pipe is used, it is usually preferable to polish or smooth out its outer surface prior to assembly. Suitable clamps are then associated with the washers to positively hold each washer in close relationship relative to adjacent washers. The tubing 10 is then heated sufficiently to cause it to creep slightly outwardly from within the washers. Usually it is desirable to spray a coolant such as water or oil over the outer surface of the laminations or washers simultaneously with the heating of tubing 10. While the tubing is in its elongated condition, the end tool joints or members 11 and 12 are mounted on the ends of pipe 10 extending beyond the laminations, the end members are brought into snug abutment with the end laminations.

In operation the well tool may be used in any conventional or desired manner. The drill collar may be used singly or in tandem at the lower extremity of the drill stem. The added flexibility of the laminated drill collars clearly reduces the likelihood of the failure of the pin of either a drill sub, a drill bit or a drill stem. In addition, the laminations appear to provide a deadening effect whereby the laminated drill collar serves as a vibration or impact absorber.

It is contemplated that the laminations or washers may be made of metal having extreme hardness characteristics. Inasmuch as the load is not carried by the laminations, the characteristic brittleness of most known hard materials is not usually objectionable. Thus, the laminated drill collar serves also as a wear collar.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. A drill collar adapted to be connected in a drill string, the major peripheral portion of which is fabricated from superimposed metal laminations supported and shrunk upon a rigid tubular base member, each lamination comprising a relatively flat circular element with the surfaces of adjacent laminations abutting each other, the inner periphery of each circular element engaging the base member and the outer periphery of the elements forming the outer surface of the drill collar, each element being formed from a flat sheet of material whereby the thickness of the element is considerably less than the transverse area of said element between the inner and outer peripheries thereof.

2. A drill collar adapted to be connected in a drill string including, a rigid tubular member having a bore extending entirely therethrough, and a plurality of annular metallic elements mounted in superposed relation on the member, each element having a central opening through which the member extends with the wall of said opening engaging the outer periphery of said member, the outer peripheries of the elements co-acting with each other to form the major portion of the external surface of the drill collar, each element having a thickness which is sufficiently less than the transverse area of the element between its inner and outer peripheries to impart an inherent flexibility to said element to permit flexure of the element in a plane transversely of the element.

3. A drill collar including, a rigid tubular member, a plurality of annular metallic elements mounted in superposed relation on the member, each element having a central opening through which the member extends with the wall of said opening engaging the outer peripheries of the elements co-acting with each other to form the major portion of the external surface of the drill collar, the inner periphery of each circular element engaging the base member and the outer periphery of the elements forming the outer surface of the drill collar, each element being formed from a flat sheet of material whereby the thickness of the element is considerably less than the transverse area of said element between the inner and outer peripheries thereof and a tool joint secured to each end of the member and of an external diameter sufficient to engage the adjacent metallic element whereby the metallic elements are disposed and confined between the tool joints.

4. A drill collar including, a cylindrical support having an axial bore extending therethrough and having a relatively thin wall thickness, and a plurality of metallic elements mounted on the support in superposed relation and extending throughout the major portion of the support to impart strength to the support, the outer peripheries of the elements co-acting with each other to form the major portion of the external surface of the drill collar, each element having a thickness which is sufficiently less than the transverse area of the element between its inner and outer peripheries to impart an inherent flexibility to said element to permit flexure of the element in a plane transversely of the element and tool joint end members removably secured to the ends of the support and confining the superposed metallic elements therebetween.

5. A drill collar comprising in combination, a hollow tubular supporting member, a tool joint having a larger external diameter than the supporting member threaded onto each end of the member, and a plurality of laminations superposed upon each other transversely of said member and confined between said tool joints, and forming the outer periphery of the drill collar between the tool joints, each lamination comprising a flat annular washer element having a thickness which is less than the area between the inner and outer peripheries of said element, whereby each individual washer element has inherent flexibility in a plane transversely of the element and also whereby when the washer elements are assembled in superposed relation on the supporting member, flexibility is imparted to that portion of the drill collar formed by said elements, the laminations being superposed in zones, with two of said zones comprising laminations adjacent the tool joints and of the same external diameters as said tool joints and with a third zone intermediate said first two zones comprising laminations of an external diameter less than the diameters of said tool joints.

ELVIN G. BOICE.

REFERENCES CITED

The following references are of record in the file of this patent:

UNITED STATES PATENTS

| Number | Name | Date |
|---|---|---|
| 541,507 | Sellers | June 25, 1895 |
| 851,118 | Chadwick | Apr. 23, 1907 |
| 1,115,411 | Dixon | Oct. 27, 1914 |
| 1,208,441 | Alexanderson | Dec. 12, 1916 |
| 1,389,154 | Newhouse | Aug. 30, 1921 |
| 1,535,411 | Wood | Apr. 21, 1925 |
| 1,636,057 | Jones | June 19, 1927 |
| 1,714,818 | Reed | May 28, 1929 |
| 1,731,171 | Miller | Oct. 8, 1929 |
| 1,839,850 | Hodkinson | Jan. 5, 1932 |
| 2,126,075 | Wright | Aug. 9, 1938 |
| 2,199,738 | Bowles | May 7, 1940 |
| 2,407,400 | Chamberlain | Sept. 10, 1946 |

FOREIGN PATENTS

| Number | Country | Date |
|---|---|---|
| 541,584 | Great Britain | Dec. 2, 1941 |